Patented Nov. 24, 1931

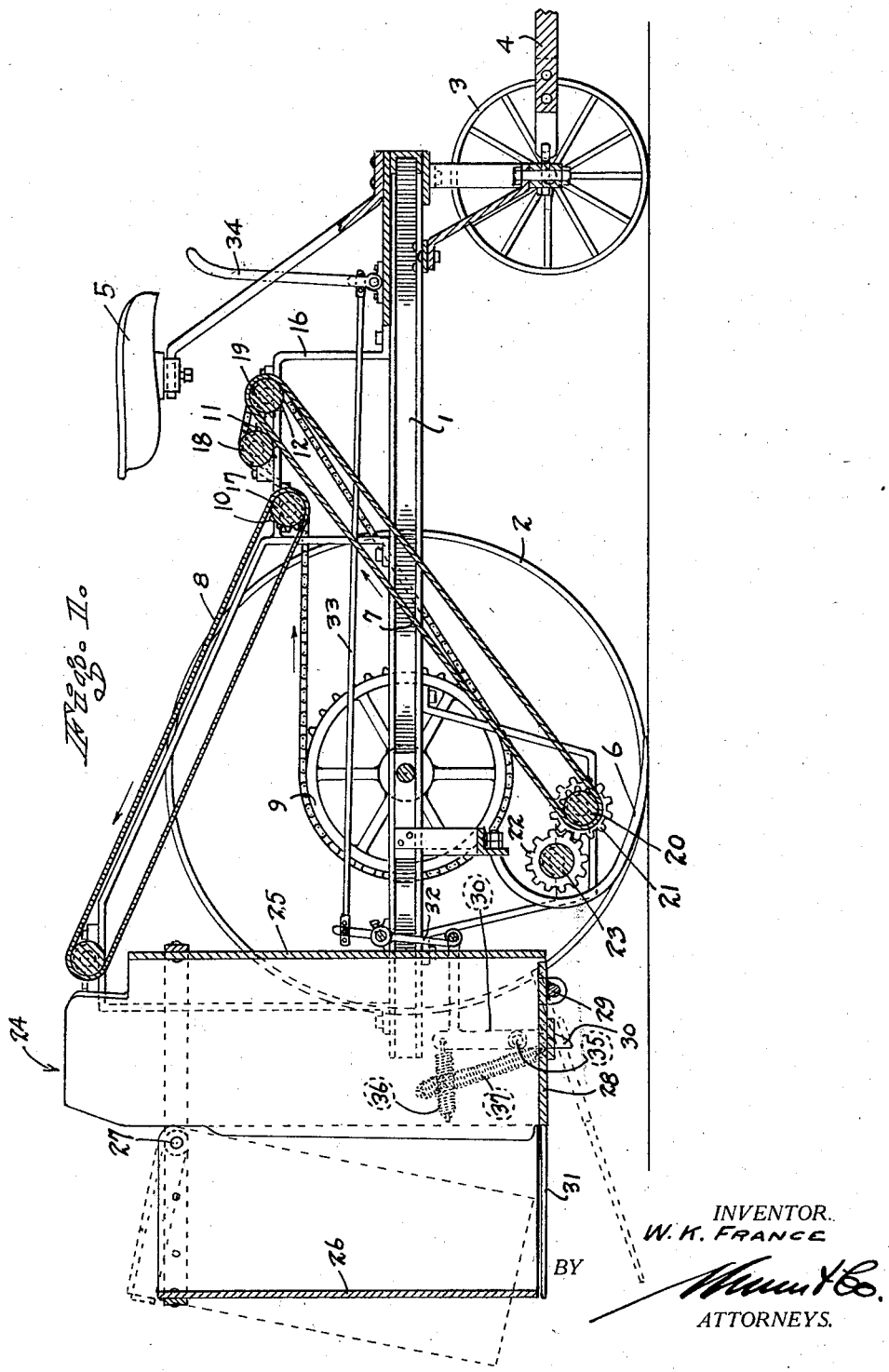

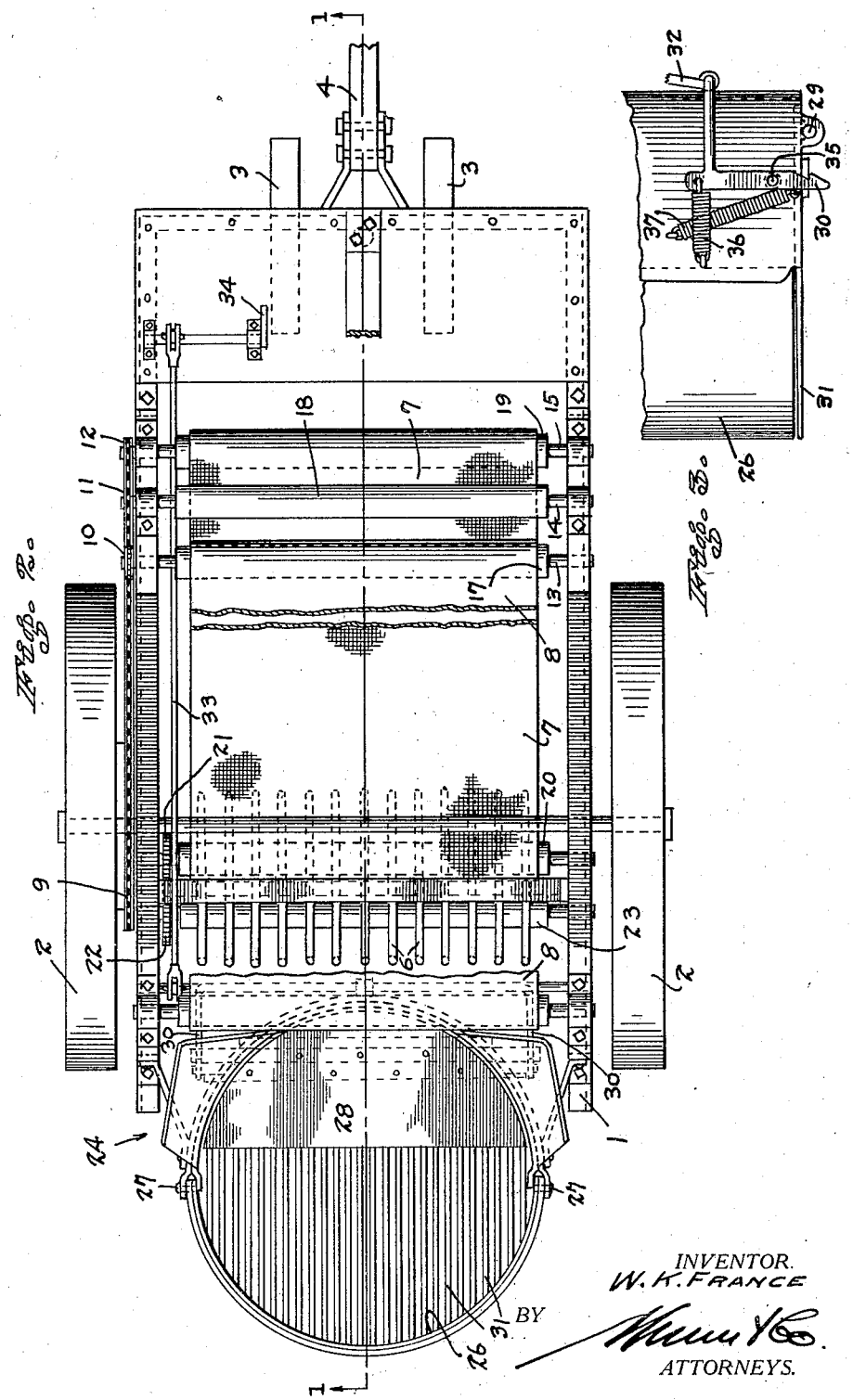

1,833,282

UNITED STATES PATENT OFFICE

WILBUR K. FRANCE, OF ROCK CREEK, OREGON

HAY SHOCKING MACHINE

Application filed September 22, 1928. Serial No. 307,680.

My invention relates to improvements in hay shocking machines, and it consists in the combinations, constructions and arrangements hereinafter described and claimed.

An object of my invention is to provide a hay shocking machine which is designed to remove cut hay from the ground and to temporarily load it in a bin and then, when enough hay has been received in the bin to form a shock, to release the shock of hay upon the ground.

A further object of my invention is to provide a device of the type described which can be controlled by one man and which is continuous in operation. The operator determines when to release the shock of hay from the machine. The device is extremely simple in construction and is durable and efficient for the purpose intended.

Other objects and advantages will appear as the specification proceeds, and the novel features will be particularly pointed out in the appended claims.

My invention is illustrated in the accompanying drawings forming a part of this application, in which Figure 1 is a section along the line 1—1 of Figure 2;

Figure 2 is a top plan view of Figure 1; and

Figure 3 shows the releasing mechanism for the hay.

In carrying out my invention, I provide a frame 1 and mount this upon rear wheels 2 and steering wheels 3. A tongue 4 connects the frame with a tractor or horses as the case may be. The driver sits upon a seat 5 disposed at the front of the machine and controls the operation of the device as well.

A frame carries a rake 6 whose teeth are inclined downwardly and forwardly for lifting the hay from the ground. The teeth convey the hay to a series of drapers which in turn convey it to a bin.

I provide two drapers indicated at 7 and 8. These are driven by one of the wheels 2. A sprocket wheel 9 is turned with the wheels 2 and rotates three sprocket wheels 10, 11 and 12 which are mounted upon shafts 13, 14 and 15 respectively. The shafts are carried by a frame 16.

Rollers 17, 18 and 19 are mounted upon the shafts. Draper 8 is disposed on the roller 17, while the draper 7 is mounted on the roller 19.

A roller 20 disposed at the other end of the draper 7 is connected to a pinion 21 that meshes with a pinion 22. The latter actuates a roller 23 which cooperates with the draper 7 for removing the hay from the fork 6 and replacing it upon the draper 7.

In like manner the roller 18 cooperates with the drapers 7 and 8 for transferring the hay from the draper 7 to the draper 8. Draper 8 conveys the hay to a bin 24 which will now be described.

This bin is shown circular in plane view (see Figure 2) and it is composed of two semi-cylindrical parts 25 and 26. Part 25 is secured to the frame 1, while the part 26 is pivotally secured at 27 to the part 25. A floor 28 is pivoted at 29 and is normally held in closed position by means of a trigger 30. The portion of the floor disposed beneath the part 26 is in the shape of a fork 31.

Figures 2 and 3 show two triggers 30 as being used, these being connected by a lever 32 and a link 33 to an actuating handle 34 disposed adjacent to the driver's seat 5. The triggers are pivotally mounted at 35 and are normally kept in closed position by a spring 36. Springs 37 return the bottom 28 to closed position when no hay is carried by the bottom.

From the foregoing description of the various parts of the device, the operation thereof may be readily understood.

The device is driven over the ground for removing the hay and it dumps the hay into the bin 24 as already described. Gravity keeps the part 26 of the bin in the full-line position, and the triggers 30 hold the bottom 28 closed. When a sufficient amount of hay has been delivered to the bin 24 to form a shock, the handle 34 is swung for freeing the bottom 28. The bottom drops into the dotted-line position (shown in Figure 1) due to the weight of the hay. The shock slides off from the bottom 28 as the machine advances, and causes the part 26 to swing in the direction of the dotted lines so as to permit the entire shock to be dropped upon the ground without spreading it over any appreciable area. The part 26 is capable of swinging through an arc of 90°, and it will therefore slide over the top of the shock of hay as the latter is lowered upon the ground.

The part 26 will instantly swing back to normal position when the hay is released, and the bottom 28 will be moved into the full-line position due to the springs 37. Triggers 30 will hold the bottom in closed position, and the bin is ready for another load. It will be seen from this that the machine is practically continuous in operation.

Although I have shown and described one embodiment of my invention, it is to be understood that the same is susceptible of various changes, and I reserve the right to employ such changes as may come within the scope of the invention as claimed.

I claim:

1. In a hay shocking machine, a hay shocking bin comprising a semi-cylindrical fixed member, a semi-cylindrical movable member hinged at its top to the top of the fixed member, a bottom hinged to the fixed member, and removable means for holding the bottom in position.

2. In a hay shocking machine, a hay shocking bin comprising a semi-cylindrical fixed member, a semi-cylindrical movable member hinged at its top to the top of the fixed member, a bottom hinged to the fixed member, removable means for holding the bottom in position, and springs connecting the bottom with the fixed member and being strong enough to swing the bottom, when free, into closed position, and weak enough to permit a shock of hay to swing the bottom open when the bottom is released.

3. A hay shocking machine comprising a frame movable over the ground, a bin carried thereby, a fork disposed adjacent to the surface of the ground, drapers for lifting the hay from the fork to the bin, rollers cooperating with said drapers for conveying the hay from the fork to the first draper and from the first draper to the second, and manually-controlled means for dumping the hay from the bin when a sufficient load has been received.

4. In a hay shocking machine a frame, a bin carried thereby and consisting of a semi-circular fixed part and a semi-circular movable part, the movable part being pivoted at its top to the fixed part, a circular bottom for the bin, a portion of the bottom being formed of tongs, a spring-pressed trigger for holding the bottom in closed position, manually-controlled means for releasing the trigger, and spring means for returning the bottom to closed position after the dumping of a shock of hay.

5. In a hay shocking machine, a hay shocking bin comprising a fixed receptacle forming a part of the bin, a movable receptacle forming the remainder of the bin and being pivotally supported at its top, a bottom hinged to the fixed member, catches normally supporting the bottom, and manually controlled means for freeing the catches from the bottom.

WILBUR K. FRANCE.